United States Patent [19]
Bristol, II

[11] 3,798,426
[45] Mar. 19, 1974

[54] PATTERN EVALUATION METHOD AND APPARATUS FOR ADAPTIVE CONTROL

[75] Inventor: Edgar H. Bristol, II, Foxboro, Mass.

[73] Assignee: The Foxboro Company, Foxboro, Mass.

[22] Filed: Dec. 20, 1971

[21] Appl. No.: 209,989

Related U.S. Application Data

[63] Continuation of Ser. No. 829,960, June 3, 1969, abandoned.

[52] U.S. Cl................ 235/151.1, 235/150.1, 444/1
[51] Int. Cl........................... G06f 15/46, G06g 7/66
[58] Field of Search ..... 235/150, 150.1, 151, 151.1; 318/610; 444/1

[56] References Cited
UNITED STATES PATENTS

| | | | |
|---|---|---|---|
| 3,419,772 | 12/1968 | Ross................................ | 235/151.1 |
| 3,230,351 | 1/1966 | Platt et al. ........................... | 235/151 |
| 3,428,791 | 2/1969 | Chandos........................... | 235/151.1 |
| 3,458,821 | 6/1969 | Clarridge...................... | 235/151.1 X |
| 3,622,767 | 11/1971 | Koepcke........................ | 235/151.1 |

OTHER PUBLICATIONS

Bristol et al: Adaptive Proren Control by Pattern Recognition, Instr. & Control Systems, Vol. 43/3, March 1970, pages 101-105.

Primary Examiner—Felix D. Gruber
Attorney, Agent, or Firm—Norman E. Brunell

[57] ABSTRACT

A method is provided for automatic adaptation of process controller parameters according to the requirements of a non-linear process in order to achieve optimum control action. This method evaluates the response of a measured process variable to upset in the form of a change in set point or load. The upset initiates the adaptation procedure, which determines evaluation intervals related to process dead time and lag characteristics as evidenced by the response of the measured variable over predetermined portions of said upset; the deviation in the measured variable from set point or related demand reference is examined over the evaluation intervals and preferably integrated, the integrated error result being indicative of a required proportional gain change in the case of one type of evaluation interval and indicative of a required reset gain change in another type of evaluation interval. Proportional and reset gains are altered in accordance with this procedure until the gains are optimized as evidenced by maximum conformity to the demand references of the measured variable response to upsets generally.

33 Claims, 8 Drawing Figures

PATTERN EVALUATION METHOD AND APPARATUS FOR ADAPTIVE CONTROL

CROSS REFERENCE TO RELATED APPLICATION

This application is a continuation of application Ser. No. 829,960 filed June 3, 1969 now abandoned.

BACKGROUND OF THE INVENTION

1. Field of the Invention

This invention provides a method for automatically adapting parameters of a process controller, which method may be carried out by any suitable and convenient means. An objective of automatic adaptation of controller gain settings is the improvement of process control over that degree of control that may be achieved when process controllers require retuning by an operator. In a non-linear process, frequent retuning of controller gains may be required for acceptable control of the process. However, frequent retuning of controller gains is not always practicable, and in any event would require the attention of a skilled operator. With the objective of providing a more complete automatic control of a process, it often becomes desirable to have provision for self-adaptation of feedback controller gain settings. A satisfactory approach to a self-adaptation procedure would aid in the pursuit of more complete plant automation, proces optimization and efficiency, and contribute to safe process operation, economy, and increased operator utilization where applicable.

2. Description of the Prior Art

Attempts have been made to provide means of automatic adaptation for controller gain settings such as would optimize control of a non-linear process. These attempts generally employ some form of frequency analysis of the process measured variable response to load or set point upset. These attempts make complex assumptions as to the relationships between controller gains and the dynamics of a measured variable response as might be indicated by some form of frequency evaluation. None of these approaches of the prior art has proved to be entirely satisfactory for the requirements of controllers on non-linear processes.

SUMMARY OF THE INVENTION

In order to provide for a method of adaptation capable of optimal matching of controller characteristics to a nonlinear process as required, the present invention proposes a scheme generally suitable for a continuous monotonic process that can be stabilized by appropriate control of a process manipulated variable. This scheme provides a self-adaptation procedure that utilizes upsets to update the gain settings of a feedback controller. The adaptation procedure of the present invention may be carried out by any convenient means capable of the speed and complexity required, such as by an analog computer, or by a programmed digital computer.

In the case of a process under direct digital control, wherein the controller functions are provided for by appropriate control law computations, it is convenient to employ the adaptation procedures of the present invention, inasmuch as the application may be effected by additional programming to an already existing programmed computer control system. Handbooks describing programmed control law computations, including provisions for proportional and reset functions, have been published over the last few years in connection with process control by digital computers. It is to be noted that computer control of a process is evidenced by extensive prior art, for example U. S. Pat. No. 3,377,623 issued Apr. 9, 1968, and assigned to The Foxboro Company. Programming of these prior art computer control systems is within the skill of the art; more particularly, the programming, of the method of the present invention for an appropriate computer process control application will be within the skill of the art. The teachings of the disclosure herein will enable the skilled artisan to effectuate this type of application, and practise the method of the invention as desired.

The method of the present invention may for convenience be considered a pattern recognition scheme. In its broad aspects, the pattern recognition scheme evaluates the response of the process measured variable to either a set point change upset or a load upset. Evaluation time intervals are set up in accordance with intervals computed on the basis of the initial recovery behavior of the measured variable. The measured variable error with respect to a pre-selected demanded response level is integrated over the evaluation time intervals and the results employed to provide for updating of process controller proportional and reset gain settings.

The adaptation scheme of the invention is generally applicable to conventional two-term controllers, or to any process controller utilized in a process feedback control loop having proportional and reset gains, or their equivalents. In a broad sense, any control signal receiving attenuation or amplification and applied to feedback control of a process variable may be said to have a proportional gain level represented by the degree of attenuation or amplification. Add to this simple gain function some form of accumulation of the error signal over time, and the combination is in effect a two-term controller. As noted above, the controller may be in conventional hardware form, such as electrical or pneumatic, or may be in functional form in a computer embodiment such as a direct digital control system or may be in any other form suited to carry out the method described. Of course, the controller may have three or more terms, the invention providing for adaptation of the basic proportional (amplitude) and reset (integration) functions of any more complex controller form. It is not the purpose of this disclosure to provide teachings as to controllers as such, but rather to point out that the method of the present invention is broadly applicable to any process feedback controller utilizing proportional or reset functions. It will be within the skill of the art to utilize the method of the invention with any form of two (or more) term controller, should it appear desirable to do so, on the basis of the teachings herein. The method taught may also be employed to modify only a single term of a controller (either proportional or reset) if such an application should be desired, as would be useful with a single term controller.

An advantage of the method of the invention is that it may be applied to adapt the parameters of a process controller to process characteristics. In the case of the unknown process, the method of the invention will automatically tend to effectuate an optimum adaptation of the controller gain settings, proportional and reset, without assistance from an operator. If provision is made for safety factors the method of the invention can be employed for start up of an unknown process, and the adaptation procedures will automatically optimize the controller settings toward achieveng the desired response of the measured variable. As a rule, any non-linear process of continuous monotonic type may be more safely controlled at a variety of operating levels than is possible with conventional control requiring controller tuning by the operator.

BRIEF DESCRIPTION OF THE DRAWINGS

These and other advantages of the invention will be apparent from the following specification together with the drawings in which.

DETAILED DESCRIPTION OF THE INVENTION

Figure 1:
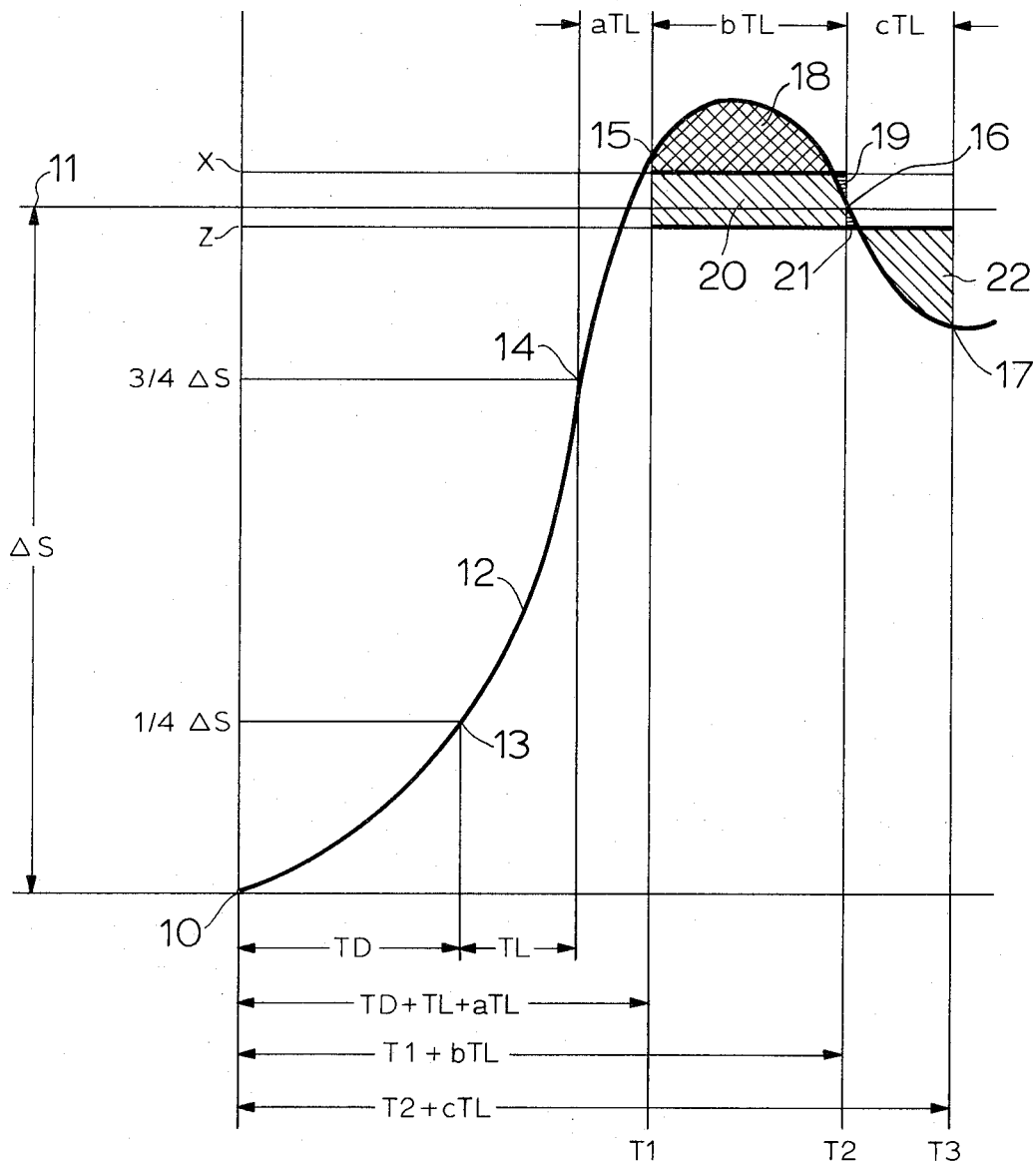
FIG. 1 is a plot of measured variable response to a change in set point, prior to adaptation, showing measured and calculated timing intervals, and evaluation intervals with error integration.

In describing the method of the invention, reference is first made to FIG. 1, which is a typical plot of a measured variable responding to an upset in the form of a set point change, prior to adaptation, wherein the controller proportional and reset gain settings are not optimum. Time is scaled to the right and amplitude vertically upwards from point 10, which is illustratively the reference for both time and amplitude. A set point change is initiated at time zero (point 10), at which time the set point S is stepped from the previous set point level which is coincident with point 10, to a new set point level 11. Measured variable response curve 12 represents the operation of a two-term controller regulating the measured variable to set point 11 by controlling the process valve, or some other process manipulated variable. AS noted above, it is required that the process can be dealt with in this manner, and that a controller can effect stable regulation of the measured variable to some extent by appropriate control of the manipulated variable, even though the process may be highly non-linear, and the control problem a difficult one.

Upon the occurrence of the set point change upset, the adaptation procedure provides for sensing the amplitude of the set point step $\Delta S$, that is, the difference between the previous set point level and the new one. This amplitude is then divided into preselected portions, and two reference levels are determined corresponding to these portions intermediate the old set point level at point 10 and the new set point level 11. These reference levels are identified as ¼ $\Delta S$, and ¾ $\Delta S$, $\Delta S$ symbolizing the entire step in set point between points 10 and 11, ¼ $\Delta S$ indicating a level equal to one-quarter of the amplitude of the set point step, and ¾ $\Delta S$ indicating a level to three-quarters of this amplitude. The precise factors of ¼ and ¾ are not critical, and alternative levels intermediate the set point change can be employed, such as, for instance, ⅓ and ⅔, or 1/5 and ⅘, or any other factors as may be satisfactory in practice.

The adaptation procedure refers to these ¼ $\Delta S$ and ¾ $\Delta S$ levels, and from point 10 clocks to determine the response time interval required for the amplitude of the measured variable to reach level ¼ $\Delta S$, shown as point 13. This response time interval, the interval between points 10 and 13, is labelled TD, and is indicative of process dead time. Another interval is clocked to determine the time it takes for the measured variable to go from level ¼ $\Delta S$, point 13, to level ¾ $\Delta S$, point 14. This response time interval is labelled TL, and is indicative of closed loop lag. Response time interval TD is assumed to bear a significant relationship to any process dead time, in that process dead times have their effects early in the measured variable response. Response time interval TL is assumed to bear a significant relationship to process closed loop resonant time, in that these effects show up soon after the measured variable response curve starts to recover. Thus, response time intervals TD and TL serve as a basis for identifying process behavior.

A set of computed time intervals is calculated by provision thereof in the adaptation procedures, using response time interval TL and predetermined constants $a$, $b$, and $c$. A computed interval $a$TL is calculated ($a \times$ TL), and with this computed interval an instant T1 is determined, wherein T1 = TD + TL + $a$TL. Another computed interval $b$TL is calculated, ($b \times$ TL) and with this computed interval an instant T2 is determined, wherein T2 = T1 + $b$TL. An additional computed interval $c$TL is calculated ($c \times$ TL), and with this computed interval an instant T3 is determined, wherein T3 = T2 + $c$TL. FIG. 1 illustrates the relationship of the computed time intervals to occurrences T1, T2, and T3, in that the computed intervals $a$TL, $b$TL, and $c$TL may be considered as sequentially added to response time intervals TD and TL, to produce evaluation intervals defined by T1, T2, and T3.

A set of exemplary values for constants, a, b and c are $a = 0.25$, $b = 0.50$, and $c = 0.25$. In practice, these values of constants $a$, $b$, and $c$ have been found to yield satisfactory results in carrying out the adaptation procedures. When these values are employed, experiment demonstrates, and analysis confirms, that the main transient of the process measured variable, responding to an upset is significantly developed during the evaluation interval defined by ($b$TL + $c$TL), that is, between T1 and T3. This main transient may conveniently be considered as a damped sinusoid superimposed upon an exponential decay, this view being a conventional analytical one of process loop behavior with a two-term controller. In this view, the first half cycle in a response (the damped sinusoid) develops during the evaluation interval defined by $b$TL, between T1 and T2. A significant portion of the exponential decay appears during the evaluation interval defined by ($b$TL + $c$TL), between T1 and T3, in that the resonant cycles in the response tend to average out over a longer evaluation interval, emphasizing the exponential decay component of the response. It may be noted that there are alternative ways to calculate these intervals, for example, the ($b$TL + $c$TL) computed interval could be calculated by a computation $f$TL, where f is another constant equal to $b + c$; in the exemplary set given above, constant $f$ would be equal to 0.75 for the computation fTL to yield the same computed interval as (bTL + cTL). Note of this is made to emphasize that it is important to provide suitable intervals, not the particular mechanics chosen to perform the actual calculations and obtain these intervals. That is, once the importance of a pattern recognition scheme employing computed intervals for determining occurrences T1, T2, T3 is understood, it is within the skill of the art to provide alternative means for effecting the required calculations. It is also to be emphasized that other values for constants a, b, and c may be employed, as may be determined to be satisfactory by experimental use thereof.

The computed interval aTL is added to the response time intervals TD + TL in order to provide a margin of time after the end of TL and before the commencement of the evaluation intervals T1–T2, and T1–T3. This margin of time, aTL, allows for further development of the response after its attainment of the ¾ ΔS level, so that the response will be at some less predictable value at time T1, which is at the end of the aTL margin interval and at the start of the evaluation intervals. This less predictable value of the response at time T1 has the consequence that the error examination over the T1–T2 evaluation interval is more dependent on response behavior than would be the case if the evaluation interval commenced immediately after response time interval TL, interval TL being terminated by the response reaching ¾ ΔS, as noted above. If an evaluation of every type of response always began with a response level of ¾ ΔS (that is, at the end of response time interval TL), it will be appreciated that the unique results of the error examination over the evaluation interval T1–T2, for each response, would tend to be degraded by the predictability of the response value ¾ ΔS at the early part of the evaluation interval T1–T2. Margin interval aTL determines a time T1 for commencing the evaluation intervals which allows the response of the measured variable to achieve some more unique value than ¾ ΔS at time T1, which value is then more closely related to the particular behavior of the response under examination.

Provisions of a margin interval aTL subsequent to response time interval TL not only improves the results of the succeeding error evaluation steps, but has a useful consequence in response undershoot cases. It is useful to determine a time T1 which is delayed after the end of the TD + TL response time intervals by a computed time interval aTL, rather than attempting to relate T1 to a crossover of the measured variable response with set point level 11, inasmuch as there may not be such a crossover in those cases the measured variable response exhibits considerable undershoot. The use of computed interval aTL to determine time T1 gives a more universal basis for starting error evaluation, in that time T1 so determined is sufficiently equivalent to the time the measured variable response actually reaches set point level 11, when it does, with time T1 also being adequately determined for undershoot cases when no such crossover occurs.

Inasmuch as the adaptation scheme depends upon an actual crossover of the ¾ ΔS level (to determine the end of response time interval TL), it is desirable to provide for minimum allowable controller gains such as will practically insure that every measured variable response to an upset will exhibit a crossover of the ¾ ΔS level, or whatever level has been selected to determine the end of interval TL.

Figure 2:
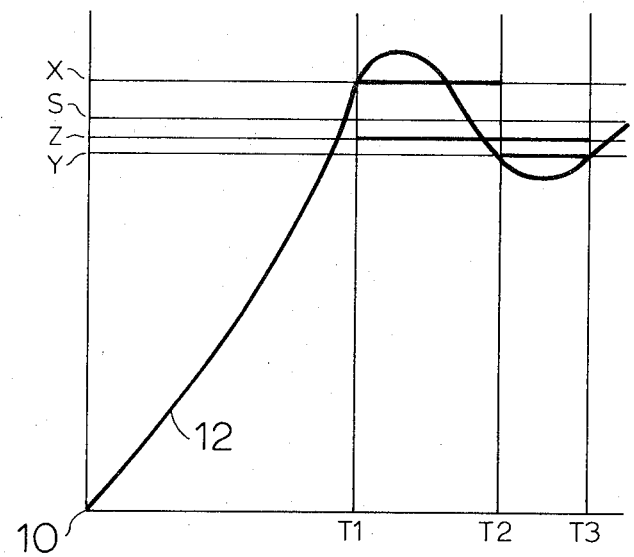
FIG. 2 is a plot of a first shape of demanded response modifying the set point level.
Figure 3:
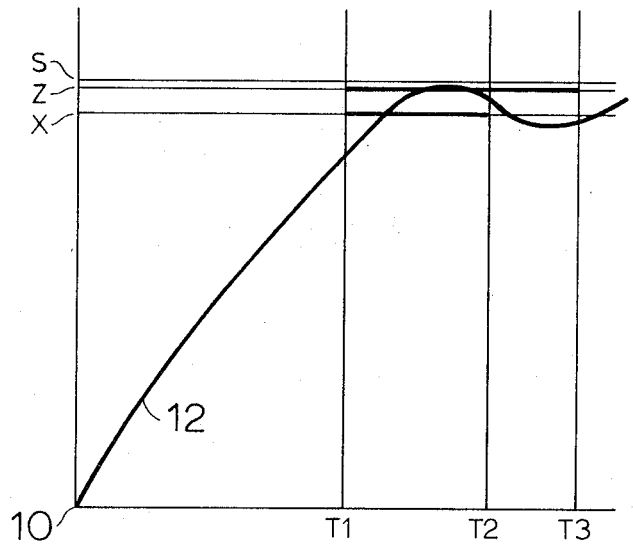
FIG. 3 is a plot of a second shape of demanded response modifying the set point level.

The adaptation procedures provide that beginning at time T1, the measured variable response is evaluated in some manner over evaluation intervals. Broadly, the evaluations of the response consider the deviation in the measured variable from a desired reference level, either set point level 11, or what is often desirable in practice, a reference which is in effect a modification of the set point level. Various ways may be used to determine set point modifying references with respect to one or more evaluation intervals. When the adaptation procedures, for example, include evaluation intervals for both proportional and reset gain adjustments, with evaluation interval T1–T2 provided for the proportional evaluation, and a second interval T2–T3 provided for the reset evaluation, a reference X may be provided for use with interval T1–T2, and a reference Y for interval T2–T3. Alternatively, while employing reference X for the evaluation of proportional gain, it may be more desirable to examine the deviation of the measured variable response over the entire interval T1–T3 in order to include greater averaging of the resonant portion of the response in the reset calculation. A third reference Z is provided for this last case, in which the deviation of the measured variable response is taken with respect to reference Z over both evaluation intervals T1–T2, and T2–T3, for the increased averaging evaluation of the reset gain adjustment. Reference X and Z are illustrated in FIG. 1. FIGS. 2 and 3 more particularly point out the use of reference levels to modifying the set point level 11 to define the desired reference level. FIG. 2 shows a positive reference level X (effectively increasing set point level 11 with respect to level 10), and negative references Y or Z (effectively decreasing set point level 11). Reference level Z is shown as a demand equivalent to reference level Y; the degree of modification of set point level 11 required by reference Z will be less than that modification required by reference Y to effect the same demanded response shape over the T2–T3 interval when the evaluation of the response takes the form of the error integration method described below. The adapted response shape more nearly takes the form of references X and Y, when they are employed. When references X and Z are used, the enlarged averaging interval T1–T3 calls for a reduced level of the Z reference to provide the measured variable response demand called for by a higher reference level Y in the T2–T3 interval. FIG. 3 shows the altered measured variable response demand when reference X is negative. The adaptation procedures can provide for relative use of references X and Y (or Z), wherein positive references effectively increase the set point step, and negative references effectively decrease the size of the step.

A most convenient method of performing the required response evaluation over the evaluation intervals is to integrate the deviation of the measured variable response from the appropriate reference leves; illustratively, in FIG. 1, reference X over evaluation interval T1-T2, and reference Z over evaluation interval T1 – T3, with a zero result for the integration over its respective evaluation interval being taken as indicative of acceptable response. From time T1, integration of the measured variable deviation from reference X continues until time T2, that is, over the interval determined by calculation bTL. When reference X is positive, as in FIGS. 1 and 2, it becomes in effect a demand for overshoot of the measured variable, inasmuch as some part of measured variable curve 12 must be above reference X in the evaluation interval between T1 and T2 in order for the error integration during this evaluation interval to produce a zero result after adaptation. In FIG. 1, the integrated error is indicated by areas 18 and 19 with respect to the measured variable curve between point 15 and 16, respective measured variable amplitudes at times T1 and T2, with reference X as the basis for zero error. Area 18 represents the integrated excess of measured variable response with a positive deviation from the desired reference X level, and area 19 represents an integrated deficiency in measured variable response with a negative deviation from the desired reference X. As area 18 is obviously greater than area 19, the net integrated error is positive, which indicates too high a setting for the proportional gain of the controller.

It may be noted that this adaptive scheme inherently provides for a long term monotonic relationship between the results of the performed integrations and the proper controller gain adjustments. That is to say, where the integrated error over the evaluation interval T1 and T2 is positive, as in FIG. 1, the proportional gain setting is too high and must be reduced to a lower setting in order to reduce the integrated error over the T1 to T2 evaluation interval. Obversely, if the integration over the evaluation interval T1 to T2 were of a measured variable curve falling preponderantly below the demanded reference X, the ingegration result would be negative, and the proportional gain setting should require elevation to a higher setting to reduce the integrated error over the T1 to T2 evaluation interval towards zero. This monotonic relationship always appears over the long term, that is, always after several successive adaptations.

If reference X is negative, that is, subtracted from set point level 11 as is illustrated in FIG. 3, the negative reference X is in effect a demand for undershoot, inasmuch as in order for the integrated error over the T1 to T2 evaluation interval to be reduced to zero, curve 12 must substantially fall below set point level 11 over that interval.

In addition to the T1 to T2 integration described above, another error integration of the measured variable is illustratively performed over an evaluation interval from T1 to T3, in this case the error being the deviation from reference Z over this interval. That is to say, an integration is made of measured variable deviation from reference Z over an interval whose length is determined by calculated intervals $bTL + cTL$. Alternatively, the measured variable deviation over evaluation interval T1–T3 may be made with respect to the set point level 11, if desired.

Reference Z is in effect a demand for the long term response to reset montonically; that is, long term response behavior approaches optimum as the integrated error with respect to reference Z is reduced. In FIG. 1, the reset error is illustratively integrated from T1 to T3, and the areas under curve 12 between points 15 and 17 are taken into account with respect to reference Z throughout this T1–T3 evaluation interval. Area (18 + 20) lies under the curve 12 between T1 and T2, area (18 + 20) representing integration of positive error with respect to reference Z. Between T2 and T3, area 21 is produced by positive deviation of the measured variable from reference Z, and area 22 is produced by negative deviation, inasmuch as curve 12 crosses below reference Z in the interval T2 and T3. The error integration is terminated at time T3, the measured variable at that time being at an amplitude at point 17. The sum total of the integration represented by areas (18 + 20) + 21 − 22 is preponderantly positive, area 22 being the only subtractive component of the integration. A positive result of the integration made over evaluation interval T1 to T3 with respect to reference Z represents an integrated excess of the measured variable response with a positive deviation from the reference Z demanded, and thus too high a setting for the reset gain of the controller. Again, it is noted the relationship between the integration and the required controller reset adjustment is essentially monotonic over several successive adaptations and the correct direction of gain adjustment will generally be indicated by the determination of the preponderant deviation of the measured variable curve with respect to reference Z over the evaluation interval T1 to T3.

Figure 4:
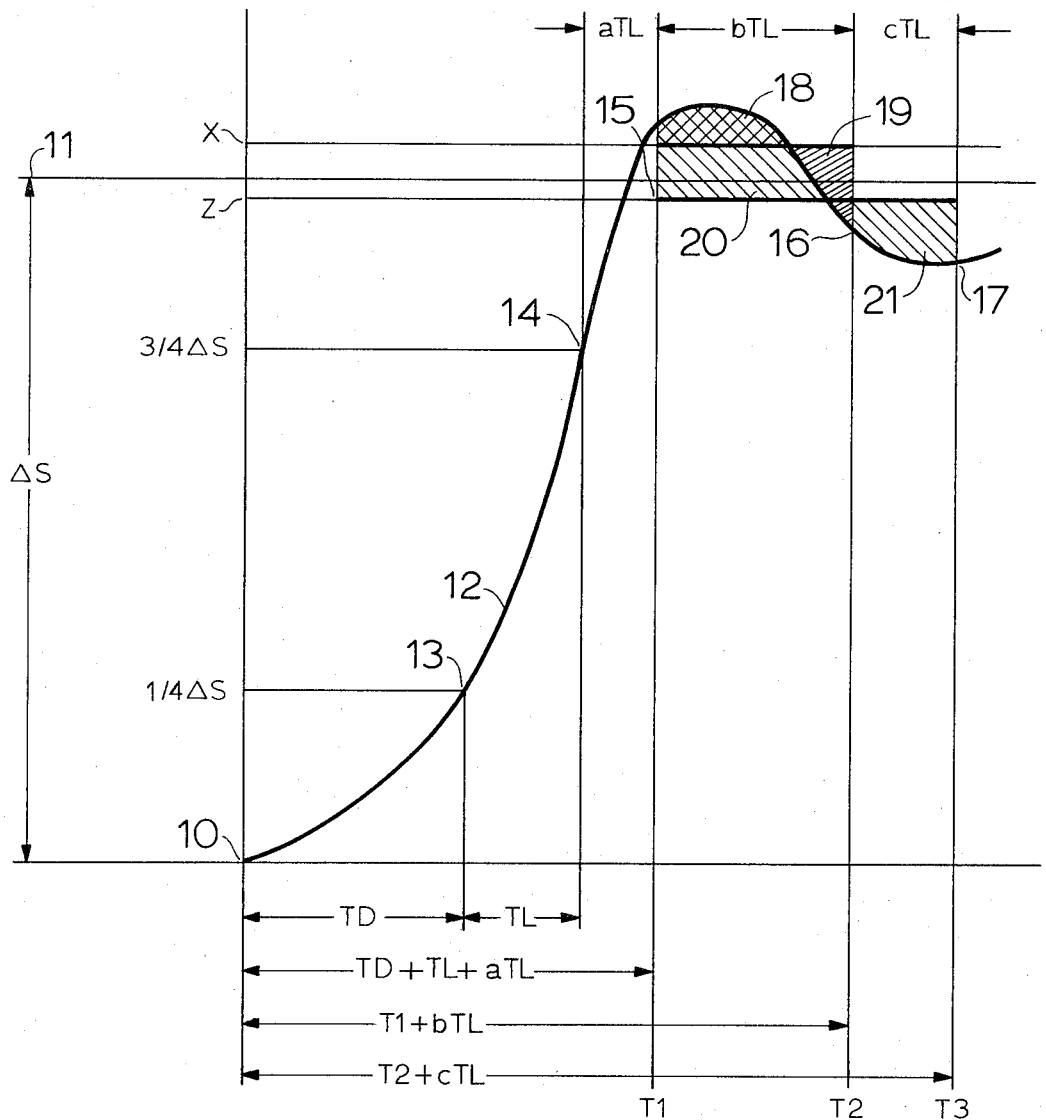
FIG. 4 is a plot of measured variable response to a change in set point after adaptation.

The adaptation procedures are designed to effectuate a measured variable response to any upset that is in practical accordance with the first approximation defined by the chosen values of references X and Z. The actual response of the measured variable is deemed optimum when the error integrations performed over evaluation intervals T1 to T2 and T1 to T3 are reduced to zero as a consequence of proper adjustment of the proportional and reset settings of the controller. FIG. 4 illustrates a typical response of the measured variable to a change in set point after an adaptation based on a positive reference X and a negative reference Z. For the proportional evaluation, positive area 18 is equal to negative area 19, and thus the net integrated error in the evaluation interval T1-T2 is reduced to zero. For the reset evaluation, with respect to reference Z, areas 18 and 20 are positive, with that portion of area 19 between curve 12 and reference Z being negative, and with area 21 being negative; the net integrated error from these areas must be zero for the adaptation to be optimum, representing maximum practical conformity of the response curve to the modified set point demands. In this case the response curve exhibits a minimum rise time at the expense of some residual overshoot. It will be apparent that a variety of response shapes may be obtained by selecting different references X and Z, as for example as illustrated in FIG. 3, which provides for a situation where little or no overshoot can be accepted.

Convenient formulas for determining new proportional and reset settings, which formulas preserve the long term monotonicity of proportional and reset settings with integrated error, are:

$$P' = P\left[\, 1 + (1/bTL) \sum_{T1}^{T2} kp(E/\Delta S - X) \right]$$

$$R' = R\left\{\, 1 + [1/(bTL+cTL)] \sum_{T1}^{T3} kr(E/\Delta S - qZ) \right\}$$

P and R are the initial proportional and reset gain settings, and P' and R' are adapted proportional and reset gain settings. E is the instantaneous deviation in the measured variable from set point S, and $\Delta S$ is the set point step amplitude originating the measured variable response; note $\Delta S$ in effect normalizes error E, so that the response shape is the principal determinant of integrated error, rather than the size of the set point change. For a particular set of controller gain settings, response effectively normalized by $E/\Delta S$ will yield roughly the same error integration even though the set point step employed may have any one of a wide range of possible amplitudes. Both kp and kr are scaling factors which can be automatically or manually adjusted to optimize adaptation. The q factor is a dead time compensation based upon TD and is normally near unity. The formula for $q$ is: $q = (TD - 0.5TL)/0.75TD$: $q$ approaches 1 for dominantly dead time processes, and 0.005 for dominantly lag type processes. In dominant lag processes, the $0.005\ q$ factor effectively eliminates the set point modification by reference Z; the rationale here is that resonant types of response are not a factor with a lag process, and that the response shape will more simply over the long term conform with the desired set point level. The terms $1/bTL$ and $1/(bTL + c\ TL)$ effectively normalize the integrated error with respect to process delays, so that with a process having either a longer or shorter period of integration than the average process, the adaptation computation performed by the formulas for P' and R' above will produce a result more nearly the same as for an average process. The factor 1 in the brackets is added to or subtracted from by the computations following the "+" signs, so that gain settings may be increased or decreased according to whether the integrated error is positive or negative, as determined by the preponderant sign of the $(E/\Delta S - X)$ and $(E/\Delta S - qZ)$ computations.

At time T3, the adaptation procedure replaced the previous P and R gains with the newly computed P' and R' settings; adaptation stops and conventional two term control continues with these updated controller gain settings until the next step in set point initiates another process measured variable upset. If, upon this next step in set point integrated error still exist with respect to references X and Z a new set of P' and R' computations are again performed according to the formulas for P' and R' above. In practice, several adaptations may be performed, each initiated by an upset, before the P' and R' gain settings become optimized, and the evaluation integrations are reduced to zero.

It will be apparent that the above formulas for P' and R' can be replaced by any alternate computations that may be based upon the integrated error determinations over the T1 to T2 and T1 to T3 evaluation intervals. For example, in the above formulas for P' and R', the initial P and R factors are multiplied by the material in brackets, as opposed to an alternate additive or subtractive approach. The multiplication approach yields proportionally larger P' and R' calculations for higher initial P and R gain settings. A variety of ways to compute P' and R' will be apparent to those skilled in the art, the objective being to expedite the pattern recognition scheme with its evaluation of error over evaluation intervals. The evaluation of the deviation of the measured variable from the modified set point level need not be in terms of integration, though that is convenient, but may be made by periodic sampling of the deviation over the evaluation intervals, and averaging, or may be in terms of examination at the beginning, end, and some other portion or portions of the evaluation intervals. All that is necessary is that the response shape be evaluated over these intervals, and that some criteria be adopted for determining that the response shape conform with the demanded response within acceptable limits.

Whether the computation of P' and R' is performed by the above formulas for same, or whether equivalent computations are based on some alternative formulas such as may be apparent to those skilled in the art, these computations for producing the adaptive P' and R' gain settings for the controller may be carried out conveniently by a digital computer. The programming for performing this application for a particular computer is within the skill of the art, and a routine production for a competent programmer. These computations may also be carried out by analog computation means. It is emphasized that whatever means is adopted for carrying out the necessary calculations associated with the self-adaptation pattern recognition scheme of the invention, it is the teachings of the method itself that is of importance, rather than the detailed mechanics of its execution, these details being either readily apparent to those skilled in the art or the subject of routine experimentation. It is only required that the particular execution means adopted be capable of performing the complex computations involved at high speed. It will be apparent that speed above human capabilities is essential, because the adaptation procedures are carried out in real time with respect to a process under control. A digital computer is particularly convenient for such computations, and the same computer may also conveniently embody the controllers in functional form provided for by programming. It is well known that such functional process controllers with a digital computer program form are conventional and standard items in systems such as those designated direct digital control systems. It will be a matter of routine application for a skilled programmer to apply procedures in accordance with the method of the invention to any controller gain settings of a digital computer process control system, where these settings are evidenced by stored signals in a computer memory.

Various refinements may be incorporated in the procedures of the adaptive scheme. For example, scaling constants kr and kp may automatically be reduced if the results of the P' and R' computations are outside preset selected limits, and the P' and R' settings recomputed on that reduced scaling basis, and these recomputed results used instead of the unacceptable first set of P' and R' computations. Then, upon the next set point step, the original values of kp and kr may be used for further computations. In this manner, the pattern recognition scheme can be made to operate satisfactorily even for large set point changes and random gain settings of the controller, while incorporating sufficient sensitivity to work with small set point steps.

Considering that the controlled process may be highly non-linear, it is desirable to provide sufficient flexibility in the adaptation procedures to update the controller proportional and reset gains upon a downward step in the set point.

Figures 5, 6C:
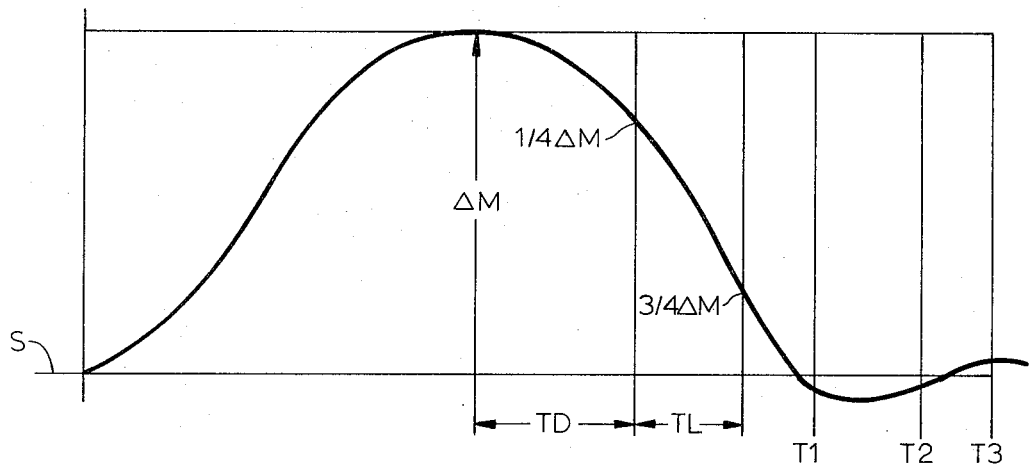
FIG. 5 is a plot of a modified procedure employing a load upset to initiate the adaptation.

As shown in FIG. 5, the adaptation scheme of the invention can readily be modified to perform adaptation at the instigation of an upset in the form of a load change rather than an upset in the form of a change in set point as described above in detail. One way to effect this capability is to monitor the deviation in the measured variable from set point. The scheme checks for maximum deviation $\Delta M$ and employs the maximum deviation level $\Delta M$ as if it were the result of a change in set point. The occurrence of this maximum deviation $\Delta M$ can be used to define the instant of upset for commencing the adaptation procedures, just as the instant of a set point change is used to commence these procedures. FIG. 5 is a plot ilustrating this modified function. From the instant when $\Delta M$ occurs, TD and TL are clocked on the basis of the measured variable response returning towards set point and reaching ¼ and ¾ of the maximum deviation $\Delta M$ with the remaining adaptation procedures being carried out as in the case of a set point change.

A useful additional feature for the adaptation procedures is the inclusion of provision for immediate controller gain reduction upon detection of excess overshoot. The scheme can check for a preselected amount of permissible rise in the response in excess of the demanded reference X level. If the overshoot is in excess of a permissible level of overshoot over the reference X level, the scheme immediately reduces the proportional (and reset, if desired) gains by a chosen amount, such as ⅔ or ¾, and the adaptation procedures are recommenced from their beginning, with the starting time being the instant of maximum overshoot, which instant is taken as the instigating upset, just as in the case of a load upset starting the adaptation procedures. Again, when the return part of the overshoot comes back towards set point, the scheme may check for overshoot in the opposite direction. If this secondary overshoot is again in excess of a preselected permissible overshoot level, the scheme immediately reduces the controller gains again, then restarts the adaptation procedures on the basis of the maximum deviation of the return overshoot being the instant of load upset. This procedure can be repeated until the controller gains have brought overshoot within permissible values. It can be appreciated that this feature provides for quickly stabilizing the process under conditions the controller gains are originally at unknown settings.

Obversely, provisions for undershoot may be made, in that the scheme can check for a minimum acceptable rise in the measured variable response over a preselected time. If the measured variable fails to achieve the required minimum, the controller gains can immediately be increased by some predetermined amount and adaptation recommenced. Thereby, it will be insured that the measured variable will reach ¾$\Delta S$ and permit continuation of the adaptation procedures.

Figure 6A:
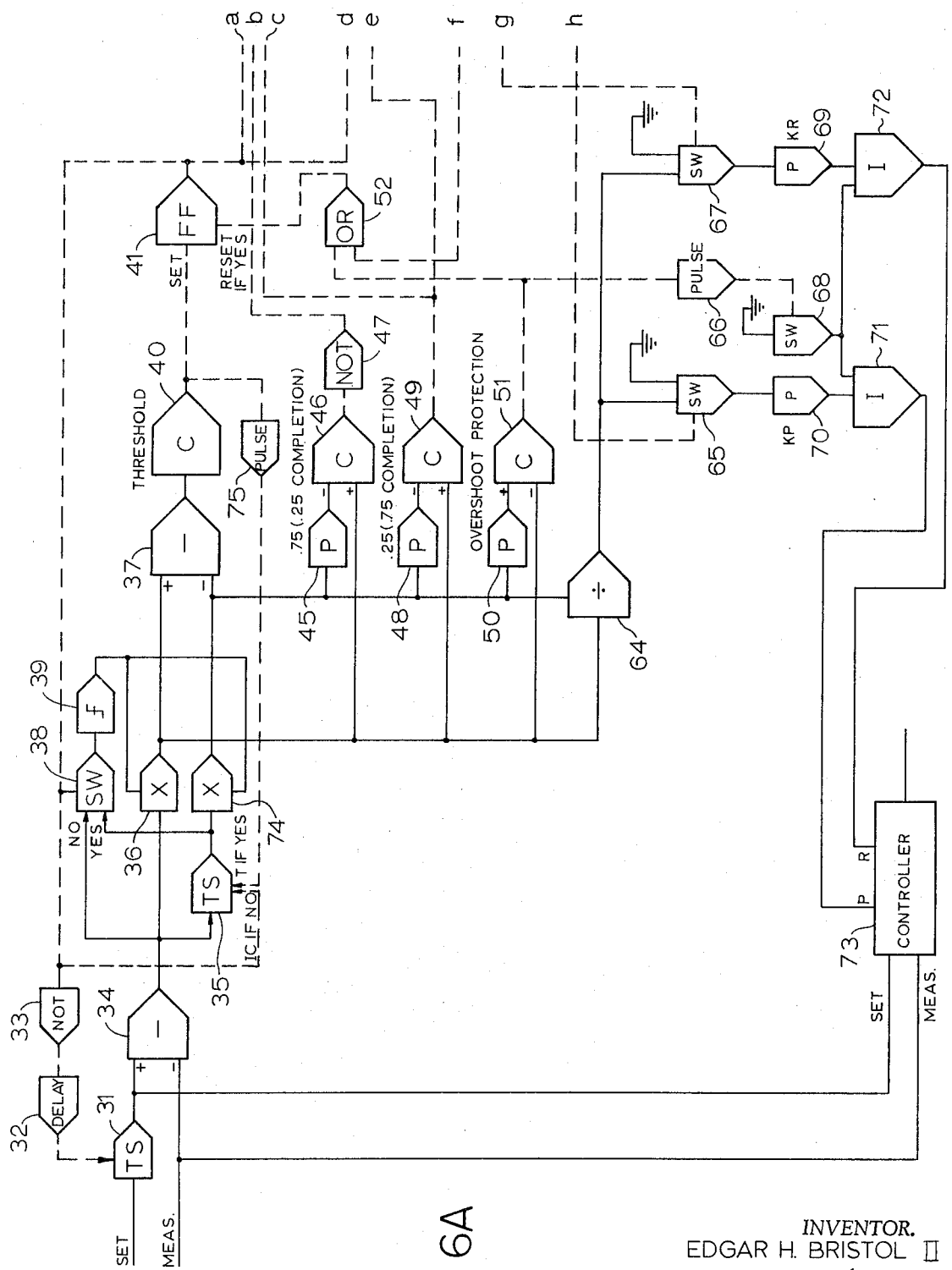
FIGS. 6A and 6B, taken together as shown in FIG. 6C illustrate an analog computer embodiment for carrying out the method of the invention.
Figure 6B:
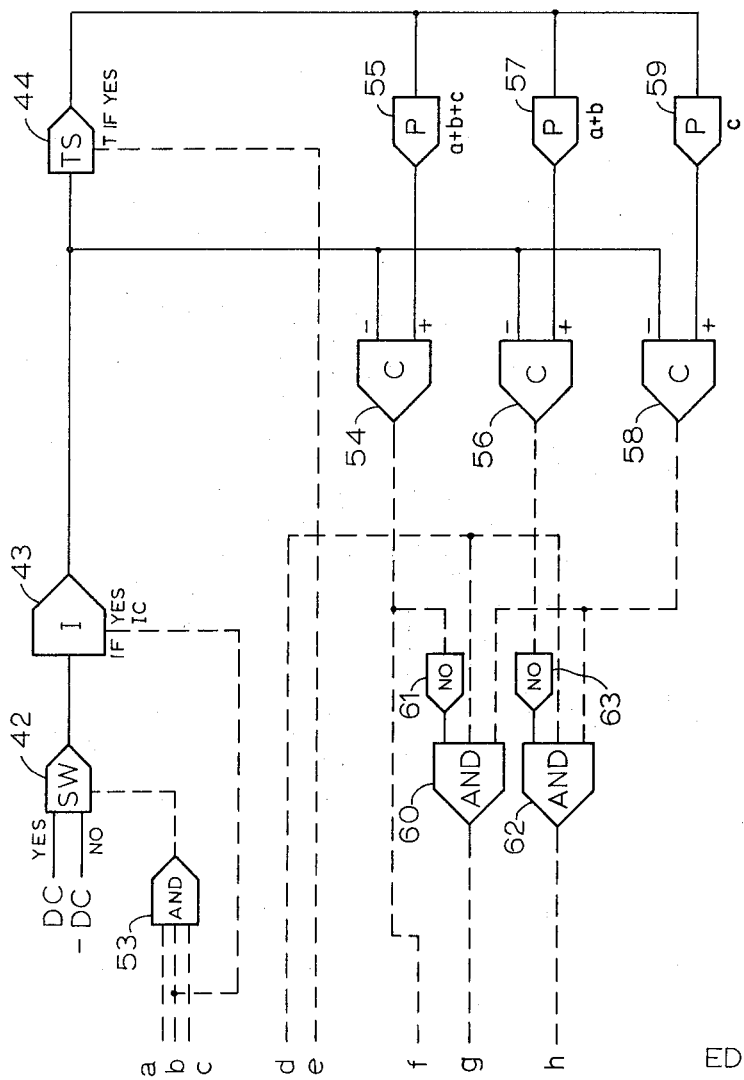

FIGS. 6A and 6B taken together illustrate an analog embodiment built of commercially available units for carrying out the invention. In FIG. 6 the following conventions are used for identification and ease of understanding of the drawings:

Solid lines are analog signal lines
Dashed lines are logic signal lines (on-off)
TS = Track store (analog memory)
− = Subtracter or differencer
X = Multiplier
÷ = Divider
C = Comparator
I = Integrator
FF = Flip Flop
P = Potentiometer
AND = And gate
OR = Or gate
NOT = Logical inverter
SW = Switch
PULSE = Pulse generator
DC = Some power supply voltage
DELAY = Logical delay unit
$f$ = Signum function (analog on-off or limited high gain amplifier)

The follwoing is a detailed description of a particular analog embodiment of the method of the invention as shown in FIGS. 6A and 6B. Directly below are descriptions of the major units or groups of units.

Units 31 – 41, & 45, 75 as a group generate signals related to the magnitudes of the error and the upset (the outputs of Units 36 and 74 respectively).

Units 45 – 49 detect 25 percent and 75 percent recovery.

Units 42 – 44 time the interval between 25 percent and 75 percent recovery, TL.

Units 54 – 59 detect occurrence of start and end of adaptation intervals.

Units 52 – 53 reset flip-flop and turn on and off timing actions in integrator 43.

Units 50 – 51 detect excessive overshoot.

Units 65 – 70 control adaptation integrators 71 and 72.

Units 71   72 are the integrators which store the values of proportional and reset gains.

Unit 73 is a conventional two term controller with some allowance for automatic adjustment of P and R.

Directly below are more detailed descriptions of units included in the groups described above.

Unit 31 – 32 exist to lock out changes in set point which occur in the middle of an adaptation.

Unit 34 computes error.

Unit 35 contains present estimate of upset magnitude.

Units 38, 39, 36, 74 effectively renormalize the error and upset signals so that the reset of the system is not affected by the direction of initial upset.

Unit 40 compares deviation of error from upset to determine if error is sufficiently great to justify initiating a new adaptation or revising the present estimate of upset magnitude. This is a threshold determination providing noise protection.

Unit 41 stores indication whether or not adaptation is in progress.

Units 43 is the clocking integrator which is held at zero value until response completes 25 percent of its recovery as detected by Units 45 – 47. Direction of clocking is controlled by units 45 – 49 so that integration procedes positively to clock TL and negatively to clock adaptation intervals.

Unit 44 stores TL when its track signal is turned off by Units 48 – 49. The various fractions of TL are calculated by potentiometers 55, 57, 59 for comparison with the output of integrator 43.

Interval TD is not separately provided for in the scheme in order to simplify the analog computation process. A more complex analog scheme may incorporate separate TD computation, which modification will be within the skill of the art.

No further description of the individual units nor of the various interconnections is required because the operation of the analog embodiment just described would be obvious by inspection to one of ordinary skill in this art.

I claim:

1. A method of operating a set point control system to improve system response to upsets to a measured variable by automatically adapting a parameter of said control system, by the steps of:
 a. measuring a time varying characteristic of the response of the measured variable to an upset during a preliminary portion of said response;
 b. generating a first gating signal to define a first evaluation time interval subsequent to said preliminary portion based on the results of step (a), said interval being suitable for evaluation of the effect on the response of the parameter to be adapted;
 c. measuring the deviation of said response from a preselected level during said time interval; and
 d. adjusting said parameter based on the results of step (c) to reduce said deviation in said response to subsequent upsets.

2. The method of claim 1 wherein step (a) further includes the steps of:
 e. determining the amplitude of the upset; and
 f. measuring the response time interval required for the measured variable to complete a predetermined portion of the response.

3. The method of claim 2 wherein the amplitude determined in step (e) is the difference between the set point level before upset and the set point level after upset.

4. The method of claim 2 wherein the amplitude determined in step (e) is the difference between the set point level and the peak of the response of the measured variable to a load change.

5. The method of claim 2 wherein step (f) includes the steps of:
 g. determining a first point in time when the response of the measured variable reaches a first predetermined level related to the amplitude of the upset from step (e);
 h. determining a second point in time when the response of the measured variable reaches a second predetermined level related to the amplitude of the upset from step (e); and
 i. clocking from said first point to said second point to measure said response time interval.

6. The method of claim 5 wherein step (b) includes the steps of:
 j. calculating the beginning of said evaluation interval by multiplying the magnitude of the response time interval obtained in step (i) by a first constant; and
 k. calculating the magnitude of the evaluation interval by multiplying the magnitude of the response time interval by a second constant.

7. The method of claim 6 including the steps of:
 l. generating a second gating signal to define a second evaluation time interval based on the results of step (a) suitable for evaluation of the effect on the response of a second parameter to be adapted;
 m. measuring the deviation between the response of the measured variable and a second reference level related to the set point during the second evaluation interval; and
 n. adjusting said second parameter on the basis of the results of step (m).

8. The method of claim 7 wherein the second evaluation interval is immediately subsequent to the end of the first evaluation interval.

9. The method of claim 7 wherein the second evaluation interval includes at least a portion of the first evaluation interval.

10. The method of claim 6 wherein step (c) includes the step of:
 o. integrating the deviation between the response of the measured variable and a predetermined reference level related to the set point during the first evaluation interval.

11. In a set point control system for controlling a measured variable in a process, the method of operating control device in said system to improve system response to upsets to the measured variable by automatically adapting at least one parameter in said control system in response to an upset, by the steps of:
 sensing the amplitude of the upset to the measured variable,
 clocking to determine at least one response time interval related to the time said measured variable reaches a predetermined intermediate level,
 determining at least one evaluation interval subsequent to said response time interval on the basis of said clocking thereof,
 evaluating the measured variable deviation from a selected reference level at least at some time during the period of said evaluation interval, and
 adjusting said parameter of said control system on the basis of the results of said evaluating.

12. The method of claim 11 including the steps of:
 detection of excess overshoot, and
 immediate reduction in the controller parameter upon such detection.

13. The method of claim 11 in which said upset is in the form of a load change causing a deviation of the measured variable from set point, further including the step of:
 modifying the load change deviation to appear as a set point change deemed to occur at the time of the maximum deviation during the first half cycle of such upset.

14. The method of claim 11 in which said upset is in the form of a set point change, wherein:
 the amplitude sensed is the difference between the initial set point and the changed set point.

15. The method of claim 14 wherein the clocking step includes:
 clocking a first said response time interval from the occurrence of said upset.

16. The method of claim 15 wherein the clocking step further includes:
 clocking a second said response time interval from the termination of said first said response time interval.

17. The method of claim 14 wherein said clocking step includes:
 clocking a closed loop lag response time interval between the times said measured variable reaches a first intermediate level corresponding to one-fourth of the amplitude of the upset, and a second intermediate level corresponding to three-fourths of the amplitude of the upset.

18. The method of claim 11 wherein said evaluation interval determining step includes:

determining two evaluation intervals related to said response time interval and subsequent thereto.

19. The method of claim 18 wherein the evaluation step further includes:
   integrating the deviation of the measured variable from a first selected reference level during the first of said evaluation intervals.

20. The method of claim 19 wherein the evaluation interval further includes:
   integrating the deviation of the measured variable from a second selected reference level during said second evaluation interval.

21. The method of claim 20 further including the steps of:
   computing a proportional gain adjustment based on said integration during the first evaluation interval,
   computing a reset gain adjustment based on said integration during the second interval, and wherein said adjusting step includes:
   adjusting the parameters of the control system in accordance with said computed gain adjustments.

22. In a set point control system the method of automatically adapting at least one gain setting in said control system in response to an upset to a measured variable, by the steps of:
   sensing the amplitude of the upset,
   determining the intermediate levels in accordance with predetermined portions of said amplitude of said upset,
   clocking to determine at least one response time interval related to the time said measured variable acquires an amplitude equivalent to a particular one of said intermediate levels,
   calculating at least one computed interval from said response time interval,
   relating said computed interval to said response time interval to determine an evaluation interval subsequent to said response time interval so that said evaluation interval is suitable to evaluate the response of said measured variable to said upset,
   examining in the period of said evaluation interval the deviation between said measured variable and a selected reference level related to said set point,
   computing a gain adjustment based upon the results of said examination and,
   adjusting said gain setting in said control system with said gain adjustment to effect an adaptation of said gain setting of said control system to modify the response of said measured variable to any subsequent upsets.

23. The method of claim 22 wherein the step of determining intermediate levels includes the step of:
   determining a first and a second intermediate level in accordance with one-quarter and three-quarters of said amplitude of said upset.

24. The method of claim 22 in which said upset is in the form of a set point change wherein:
   the amplitude sensed is the difference between the initial set point and the changed set point.

25. The method of claim 22 in which said upset is in the form of a load change causing the deviation of the measured variable from set point, further including the step of:
   modifying the load change deviation to appear as a set point change deemed to occur at the time of maximum deviation during the first half cycle of such upset.

26. The method of claim 22 wherein the clocking step further includes the steps of:
   clocking a first said response time interval from the occurrence of said upset to the time said measured variable acquires an amplitude related to an earlier reached one of said intermediate levels, and
   clocking a second said response time interval from the time said measured variable acquires an amplitude related to an earlier reached of said intermediate levels to the time said measured variable acquires an amplitude related to a later reached of said intermediate levels.

27. An adaptation device to be used with a control system having an adjustable proportional band and measurement and set point inputs, said device comprising:
   means for determining a response time interval during an initial portion of a response of said control system to an upset;
   computational means to choose an evaluation interval based on said response time interval suitable for investigating the effects on the response of the proportional band;
   means for detecting the error between the response during said evaluation interval and a desired level; and
   means responsive to said error detecting means for adjusting said proportional band to reduce said error for subsequent upsets.

28. The device of claim 27, wherein said control system further includes an adjustable reset band, said device further comprising:
   computational means to choose a second evaluation interval based on said response time interval suitable for investigating the effects on the response of the reset band;
   second means for detecting the error between said response and a second desired level during said second evaluation interval; and
   means responsive to said second error detecting means for adjusting said reset band to further reduce said error for subsequent upsets.

29. An adaptation device, for use with a control system of the type having at least one adjustable parameter, comprising:
   means for detecting the slope of a preliminary portion of the response of a measured variable of the control system to an upset;
   means to determine an evaluation interval based upon said slope suitable for evaluating the effect on the response shape of the parameter to be adapted,
   a comparator active during said evaluation interval to determine the error between said response and a desired level; and
   means responsive to said comparator to adjust said parameter based on said error determination.

30. Apparatus for adapting a process controller in response to an upset to provide optimal matching of the controller characteristics to a process, comprising:
   first means for generating a first signal related to the response time interval required for a measured variable to complete a predetermined portion of its recovery from an upset;

second means for determining an evaluation interval based on said first signal suitable for evaluating the effects on the response of a particular controller characteristic;

third means for generating a second signal to adapt said controller characteristic related to the difference between the response and a reference level during said evaluation interval.

31. Apparatus as claimed in claim 30 wherein said first means includes:

means for sensing the magnitude of said upset;

means for generating third and fourth signals related to said magnitude multiplied by first and second constants;

means for determining first and second points in time during said recovery when said measurement signal equals said third and fourth signals respectively; and means for clocking the time between said first and second points to measure said response time interval.

32. Apparatus as claimed in claim 31 wherein said second means includes:

means for determining third and fourth points in time subsequent to said second point by periods of time related to said response time interval multiplied by third and fourth constants respectively, said third and fourth points serving to define the beginning and end of said evaluation interval.

33. Apparatus as claimed in claim 32 wherein said third means includes:

an integrator for integrating the difference between the response and the reference level during said evaluation interval.

* * * * *